United States Patent [19]

Murayama et al.

[11] Patent Number: 4,977,470
[45] Date of Patent: Dec. 11, 1990

[54] TRACK-FOLLOWING CONTROL SYSTEM FOR MAGNETIC DISK DRIVE

[75] Inventors: Hiroki Murayama; Takahiko Tsujisawa; Toshikazu Hashimoto, all of Tokyo, Japan

[73] Assignee: NEC Corporation, Tokyo, Japan

[21] Appl. No.: 143,489

[22] Filed: Jan. 13, 1989

[30] Foreign Application Priority Data

Jan. 13, 1987 [JP] Japan .................................. 62-3987
Feb. 17, 1987 [JP] Japan .................................. 62-32413
Jun. 16, 1987 [JP] Japan .................................. 62-150505

[51] Int. Cl.$^5$ .......................................... G11B 5/596
[52] U.S. Cl. ............................ 360/77.040; 360/77.080
[58] Field of Search ................ 360/77.02, 77.04, 77.05, 360/77.07–77.11, 78.04, 78.14

[56] References Cited

U.S. PATENT DOCUMENTS

4,412,165 10/1983 Case et al. ........................ 360/77.08
4,530,020 7/1985 Sutton .............................. 360/77.08
4,589,037 5/1986 Jen et al. .......................... 360/77.08

Primary Examiner—Aristotelis M. Psitos
Assistant Examiner—Steven R. Garland
Attorney, Agent, or Firm—Sughrue, Mion, Zinn, Macpeak & Seas

[57] ABSTRACT

A track-following control system for a magnetic disk drive according to the present invention includes a magnetic disk, a magnetic head, a position error signal generator, a controller, and a stepping motor. One or more track position signals indicating a position of a track are recorded in the magnetic disk in numbers of sectors. The magnetic head writes and reads out normal data in and from the magnetic disk, and reads out the track position signal from the magnetic disk in the same manner. The position error signal generator generates a position error signal indicating a position error between the magnetic head and the track based on a track position signal. The controller calculates intra-sector errors by calculating an average position error of each sector and a desired number of estimated position errors of the corresponding sector by interpolation. Then, the controller produces, in numbers of the sectors, position error signals having a larger number than that of the sectors by using a position error signal supplied from the position error signal generator. The stepping motor 18 performs positioning of the magnetic head in accordance with the position error signals having the larger number than that of the sectors.

1 Claim, 4 Drawing Sheets

TRACK-FOLLOWING CONTROL SYSTEM FOR MAGNETIC DISK DRIVE

BACKGROUND OF THE INVENTION

The present invention relates to a track-following control system for a magnetic disk drive and, more particularly, to a track-following control system using a sector servo method for a high track density magnetic disk drive.

Recently, a means for increasing the density of tracks concentrically formed on a magnetic disk, for instance a floppy disk, has been employed in order to increase the recording capacity of the floppy disk as a recording medium of a floppy disk drive (FDD).

Information is recorded in and read out from the floppy disk by a magnetic head which can freely move above the surface of the floppy disk. Generally, the magnetic head is moved or seeks from a track on or from which information is currently being recorded or read out (to be referred to as a current track) to a track on or from which information is to be recorded or read out (to be referred to as a target track) under the control of a head positioning system using a servo control technique, and the magnetic head is positioned on the target track.

In the magnetic head positioning system using servo control, when the magnetic head is to be moved from the current track to the target track and is to be positioned on it, the magnetic head is roughly moved close to the target track without using the servo control (to be referred to as coarse positioning), and is then finely controlled by the servo control to follow the target track.

As the track density is increased, it is difficult to perform correct track following with a conventional open loop head positioning method. Therefore, a track-following system of a sector servo method using a closed loop feedback technique has been recently developed and used in practice.

According to the sector servo method, the tracks are divided into a plurality of sectors. A track position signal indicating the track position or servo information is recorded at part of each sector, i.e., the beginning of each sector. The servo information is read by the magnetic head. A position error signal representing a deviation between the position of the magnetic head and the track position, i.e., a position error, is obtained by using the servo information. The magnetic head is driven by a servo mechanism to minimize the position error in accordance with the position error signal, and follows the track. More specifically, in the track-following control system using the sector servo method, the magnetic head is held at a position determined on the basis of a previous servo information until a next adjacent servo information is obtained.

The number of bytes of data per sector must be variable in accordance with the operating system (OS) of the information processing system from the viewpoint of information processing. Therefore, when the number of bytes of data per sector is increased, the number of sectors is decreased. As a result, the volume of servo information is decreased and, accordingly, the number of position error signals obtained as described above is also decreased. In order to increase the data recording capacity of the floppy disk, a ratio of the data recording area with respect to the entire floppy disk area must be increased. The number of position error signals is limited from this viewpoint as well.

When the number of position error signals is decreased in the track-following control system using the sector servo method, the following problems arise because of the nature of the floppy disk.

The floppy disk has two modes of eccentricity, i.e., track distortion. The first mode eccentricity is caused by floppy disk exchange. The second mode eccentricity is caused by the environmental changes, such as a change in temperature and humidity. Of these two eccentricities, the second mode eccentricity is particularly important in design of a track-following control system.

Figure 1:
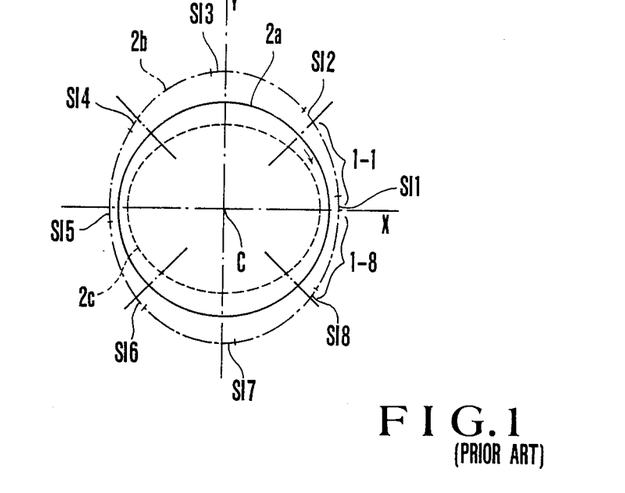
FIGS. 1, 2, and 3 are views for explaining the problems which are caused by track distortion in the conventional track following control system.

FIG. 1 is a view for explaining a track distortion formed on a floppy disk by the environmental changes.

Referring to FIG. 1, a solid line 2a denotes a normal circular track without deformation; a long-and-short-dashed line 2b and a broken line 2c, represent deformed tracks, respectively.

Sectors 1—1 to 1—8 are formed to divide the circular track 2a into 8 equal portions. Servo information SI1 to servo information SI8 are recorded at the beginning of the sectors 1—1 to 1—8, respectively.

Since the floppy disk is made of a polymer material, it greatly expands or contracts by a change in temperature and humidity. The floppy disk has so-called anisotropy wherein the coefficient of expansion differs in the vertical and horizontal directions. Therefore, as shown in FIG. 1, the circular track 2a in the normal condition is deformed to elliptic tracks 2b and 2c when the floppy disk expands and contracts, respectively.

Figure 2:
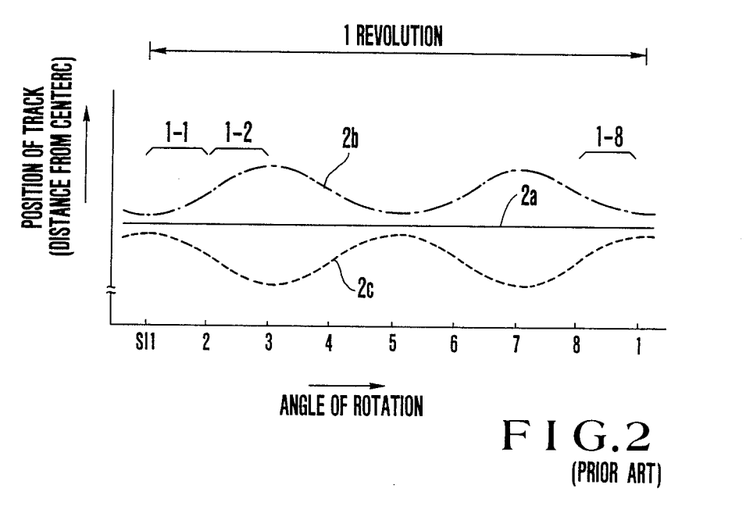

FIG. 2 is a developed view of FIG. 1. In FIG. 2, the angle of rotation of the floppy disk rotating in the direction of the arrow in FIG. 1 is measured with reference to the x-axis and plotted as the axis of abscissa, and the distance between the intersection of the x-axis and the track and a disk center C is plotted along the axis of ordinate to indicate the position of the track. The scale marks 1 to 8 on the axis of abscissa indicate servo information.

As shown in FIG. 2, the tracks 2b and 2c obtained when the floppy disk expands and contracts, respectively, form waveforms of 2 periods per revolution of the floppy disk.

Figure 3:
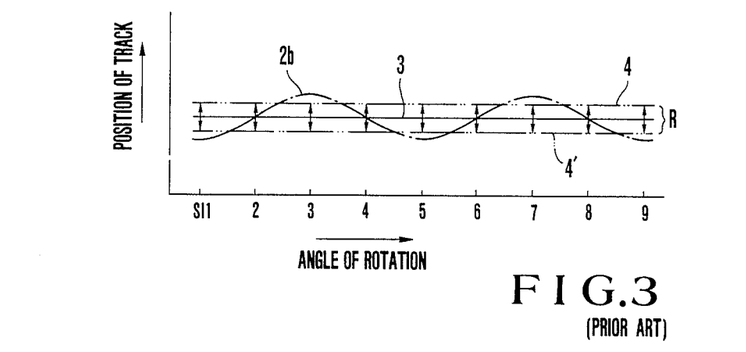

FIG. 3 is a view for explaining the problems occurring in the track-following operation for the deformed track 2b when the floppy disk expands.

A straight line 3 indicates the position or track of the magnetic head on the floppy disk immediately before start of the track-following mode when the magnetic head has been coarsely positioned on the track 2b by coarse positioning as described above. The long-and-two-short-dashed lines 4 and 4' drawn on two sides of the straight line 3 at equal distances from it define a position error detectable range R which is predetermined in the track positioning system. A position error regarding a track falling outside the range R defined by the straight lines 4 and 4' cannot be detected.

In FIG. 3, since the servo information SI2, the servo information SI4, the servo information SI6, and the servo information SI8 of the even-numbered sectors on the track 2b fall within the magnetic head position error detectable range R, they can be detected. However, since the servo information SI1, the servo information SI3, the servo information SI5, and the servo information SI7 of the odd-numbered sectors on the track 2b fall outside the position error detectable range R, they cannot be detected. In other words, despite that the magnetic head is positioned at an average position of a target track, it cannot follow the target track by the servo control since the track has a distortion due to the anisotropy in expansion coefficient of the floppy disk. As a result, data information cannot be regenerated.

This applies to contraction of the floppy disk because of the following reasons. When an FDD is manufactured, its material and structural design are appropriately selected such that a change in position of the magnetic head caused by a change in temperature and humidity compensates for a change in position of the track caused by expansion or contraction of the floppy disk.

SUMMARY OF THE INVENTION

It is an object of the present invention to provide a track-following control system wherein the above drawbacks of the conventional technique are eliminated and good track-following characteristics can be constantly obtained even when the number of bytes of data per sector is changed.

It is another object of the present invention to provide a track-following control system using a sector servo method, which is free from the above drawbacks even when the number of sectors is decreased.

The track-following control system for a magnetic disk drive according to the present invention comprises: a magnetic disk in which not less than one track position signal indicating a position of a track is recorded in units of sectors; a magnetic head for writing and reading out data in and from the magnetic disk and reading out the track position signal from the magnetic disk; means for generating a position error signal indicating a position error between the magnetic head and the track based on the track position signal; means for producing, in units of the sectors, position error signals having a larger number than that of the sectors by using the position error signal supplied from the position error signal generating means; and means for positioning the magnetic head in accordance with the position error signals having the larger number than that of the sectors.

DETAILED DESCRIPTION OF THE PREFERRED EMBODIMENT

A preferred embodiment of the present invention will be described in detail with reference to the accompanying drawings.

Figure 4:
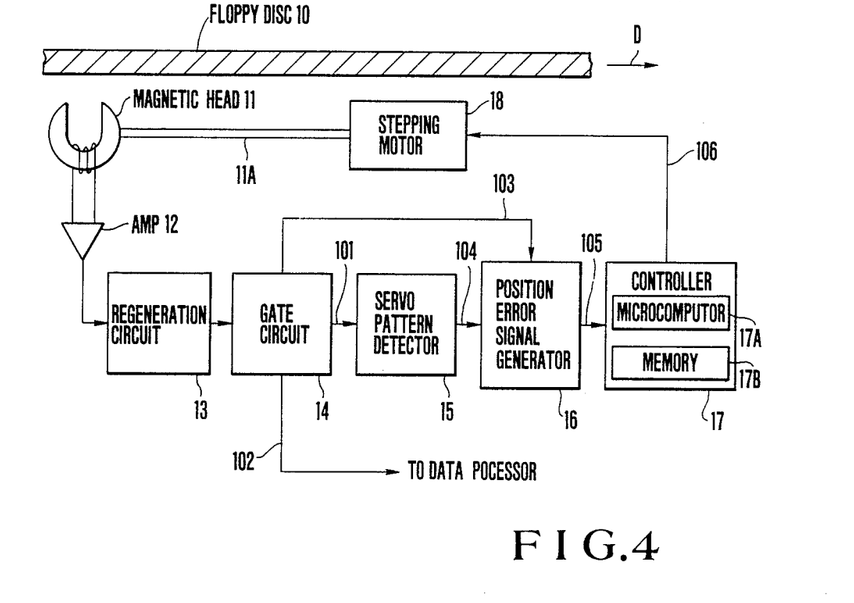
FIG. 4 is a block diagram showing an overall arrangement of a track-following control system for an FDD according to an embodiment of the present invention.
Figure 5:
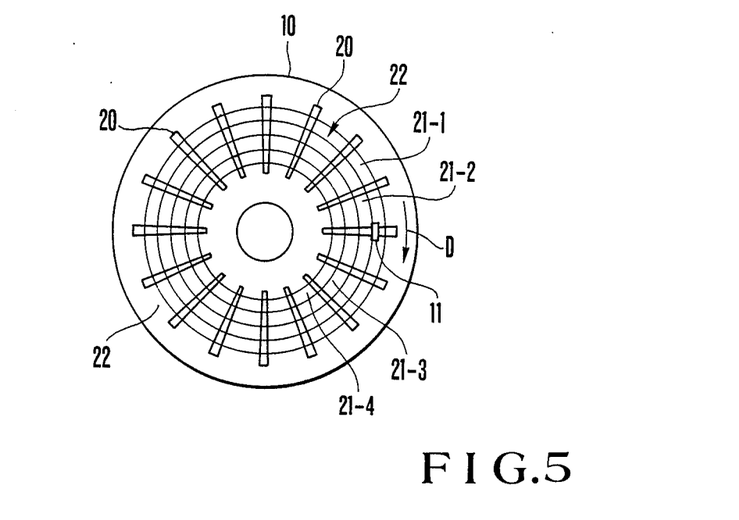
FIG. 5 shows an arrangement of the recording areas of a floppy disk shown in FIG. 4.
Figure 6:
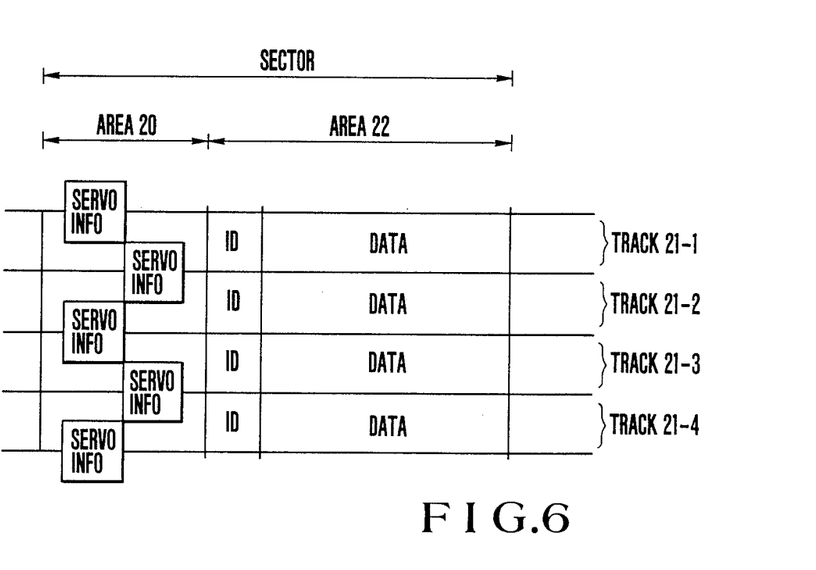
FIG. 6 shows the recording format of part of FIG. 5 in detail.

FIG. 4 is a block diagram showing an overall arrangement of the embodiment of the present invention; FIG. 5 shows the arrangement of the recording areas of a floppy disk; and FIG. 6 shows a pattern of the servo information recorded on the floppy disk.

Referring to FIG. 4, a hatched portion indicates a section of part of a floppy disk 10 along the tracks. When the floppy disk 10 is rotated, the hatched section moves in the direction of arrow D with respect to a magnetic head 11.

The magnetic head 11 is connected to a stepping motor 18 through a mechanical means 11A, and is driven by the stepping motor 18 in the direction to cross the tracks of the floppy disk 10. The magnetic head 11 reads information recorded on a track of the floppy disk 10 and supplies it to a regeneration circuit 13 through an amplifier 12. The regeneration circuit 13 regenerates the readout information and outputs it to a gate circuit 14. The gate circuit 14 classifies the information supplied from the regeneration circuit 13 into servo information and information including data but excluding servo information. The servo information is supplied to a servo pattern detector 15 through a line 101. The information other than the servo information is supplied to a data processor (not shown) through a line 102.

The servo pattern detector 15 generates a timing signal based on the servo information supplied from the gate circuit 14, and outputs it to a position error signal generator 16 through a line 104. The position error signal generator 16 generates a position error signal based on the timing signal and outputs it through a line 105 to a controller 17 including a microcomputer 17A and a memory 17B. The controller 17 processes the position error signal in a manner to be described later, and outputs a control signal to the stepping motor 18 through a line 106. The stepping motor 18 drives the magnetic head 11 in accordance with the control signal supplied from the controller 17.

The gate circuit 14 supplies a control signal to the position error signal generator 16 through a line 103.

FIG. 5 shows an example of the floppy disk 10 having 16 sectors. Only 4 tracks 21—1 to 21-4 are illustrated for the sake of convenience. Each sector consists of a servo information area 20 for recording servo information or a servo pattern, and an area 22 for recording information including data other than the servo information.

FIG. 6 is an enlarged view of a sector shown in FIG. 5. A servo pattern consisting of two types of servo information A and B is formed in the servo information area 20. Each of the information A and the information B occupies adjacent halves of adjacent tracks so as to bridge them. The information A and the information B are alternately recorded at the identical positions of the tracks 21—1 to 21—4 in the longitudinal direction thereof in the form of frequencies which are prime relative to a data signal frequency and distinguishable from each other.

The operation of the embodiment shown in FIGS. 4, 5, and 6 will be described.

First, the magnetic head 11 is set at a position corresponding to the outermost track 21—1, i.e., a position shown in FIG. 5 without setting the track-following mode, i.e., before start of the seek mode. The floppy disk is rotated and informations on the track 21—1 are read by the magnetic head 11.

The reason why the magnetic head 11 is positioned on the outermost track 21—1 is that the eccentricity of the floppy disk is maximum there.

A signal read out by the magnetic head 11 is amplified by the amplifier 12, regenerated by the regeneration circuit 13, and classified into data and servo information signals by the gate circuit 14. The servo pattern detector 15 detects the relative positional relationship between the servo pattern and the magnetic head 11 in accordance with the input servo information signal, and generates a timing signal. The position error signal generator 16 obtains a position error signal based on the timing signal, and outputs it to the controller 17. The controller 17 stores the input position error signals of M (M is an integer) revolutions of the floppy disk 10 in its memory 17B. Subsequently, using the stored position error signals of M revolutions, the controller 17 calculates the average position error of each sector. This is done in order to average the rotational variation of a spindle motor for rotating the floppy disk 10 and to remove the noise component.

Using the average position error of each sector, the controller 17 calculates a desired number of estimated position errors of the corresponding sector by interpolation. As a result, position error signals having a number larger than the number of sectors can be obtained and stored in the memory 17B.

A method to calculate an estimated position error by interpolation will be described.

Assume that the position error signals of the respective sectors are $\{(S\Delta t): S=1, 2, \ldots, N\}$ where N is the number of sectors and $\Delta t$ is the time interval between the sectors.

Assume that $S_i = S\Delta t$ where $i=1, \ldots, N$. An estimated position error signal $X(S')$ at $S'$ between $S_1$ and $S_N$ can be approximated by a Lagrange's interpolation polynominal $L(S')$ as follows:

$$L(S') = \sum_{i=1}^{N} I_i(S') \cdot X(S_i)$$

for, $$I_i(S') = \pi(S')/((S' - S_i) \cdot \pi'(S_i))$$

$$\pi(S') = \prod_{i=1}^{N} (S' - S_i)$$

where $\pi'$ is a differential of $\pi$.

The Lagrange's interpolation polynominal is successively calculated in accordance with the Aitken method.

The interpolated value $L(S')$ obtained in the above manner in stored in the memory 17B as an intra-sector position error signal $X(S')$ together with a real or an actual position error signal $X(S_i)$.

In the track-following mode, a quotient of a real position error obtained based on the track position signal actually read out at the target track by the magnetic head, and a real position error obtained from the outermost track and stored in the memory 17B, is calculated. Subsequently, the position error signal (estimated intra-sector position error) calculated for the outermost track and stored in the memory 17B is multiplied by the above quotient. The obtained product is defined as the estimated intra-sector position error of the target track and used for the track-following control together with the real position error.

The above calculation can be sufficiently performed in a real-time manner according to the operation speed of the controller 17 comprising a 1-chip microcomputer 17A.

Another embodiment having a similar arrangement as that of the above embodiment shown in FIG. 4 and a different control algorithm executed by the controller 17 will be described.

In this embodiment, real position error signals of M revolutions of the floppy disk 10 are stored in the controller 17 before start of the track-following mode. Subsequently, using the stored real position errors of M revolutions, an average real position error of each sector is calculated in order to remove the noise component, and is defined as $\{X(S\Delta t): S=1, \ldots, N\}$ where N is the number of sectors and $\Delta t$ is the time interval between the sectors, i.e., the sampling period.

An average value $\overline{X}$ of the position error of one revolution of the floppy disk 10 is calculated. $\overline{X}$ can be calculated by $$\overline{X} = (1/N) \sum_{S=1}^{n} X(S\Delta t)$$

The deviation $X(S)$ of the average value $X(S\Delta t)$ of each sector from the average value $\overline{X}$ is calculated by the following formula:

$$X(S) = X(S\Delta t) - \overline{X}$$

where $S = 1, 2, \ldots, N$

Assume an autoregressive model wherein $X(S)$ is defined as a function of previous $X(S-1)$ to $X(S-M)$:

$$X(S) = a_1 \cdot X(S-1) + a_2 \cdot X(S-2) + \ldots + a_M \cdot X(S-M)$$

An appropriate assessment function is selected, and the number of terms of the autoregressive model for minimizing the assessment function and a corresponding coefficient $a_i$ are obtained. According to the simulation for each track, the number of terms is not substantially changed by the amplitude and phase of the two modes of eccentricity of the floppy disk and values of the coefficients are not substantially changed. In time, the same equation can be used for all the tracks.

For example, when one track is divided into 30 sectors and the revolutions per minute of the floppy disk is 300 rpm, the sampling frequency is 150 Hz. In this case, the bandwidth of the servo is about 1/10 of the sampling frequency and can be about 15 Hz. The first and second modes of eccentricity are 5 Hz and 10 Hz, respectively. The number of terms of the autoregressive model based on these modes of eccentricity is 2, and its coefficients are:

$a_1 = 1.8858$ $a_2 = 0.9878$

An FPE (Final Prediction Error) is used as the assessment function to calculate these $a_1$ and $a_2$.

When the number of sectors per track is decreased to increase the data recording density of the floppy disk, the number of position errors $X(S\Delta t)$ is small and track-following accuracy is degraded by the track distortion. In order to prevent this, an estimated position error in a required angle of rotation of each sector is introduced in the equation of the above autoregressive model in addition to the actual position error $X(S\Delta t)$. Simulation is performed using this equation, and the number of terms and the coefficient of each term are calculated and stored in the memory 17B.

As described above, during the track-following operation, actual previous position errors and estimated intra-sector position errors, i.e., position errors having a larger number than the number of sectors are substituted in the equation of the autoregressive model, and a subsequent position error is estimated.

The above processing can be sufficiently performed with the operation speed of the 1-chip microcomputer 17a included in the controller 17. If a high-speed processor is used, the operation speed is further increased.

In this manner, the track-following characteristics can be prevented from being degraded even when the number of bytes of data per sector is increased.

Figure 7:
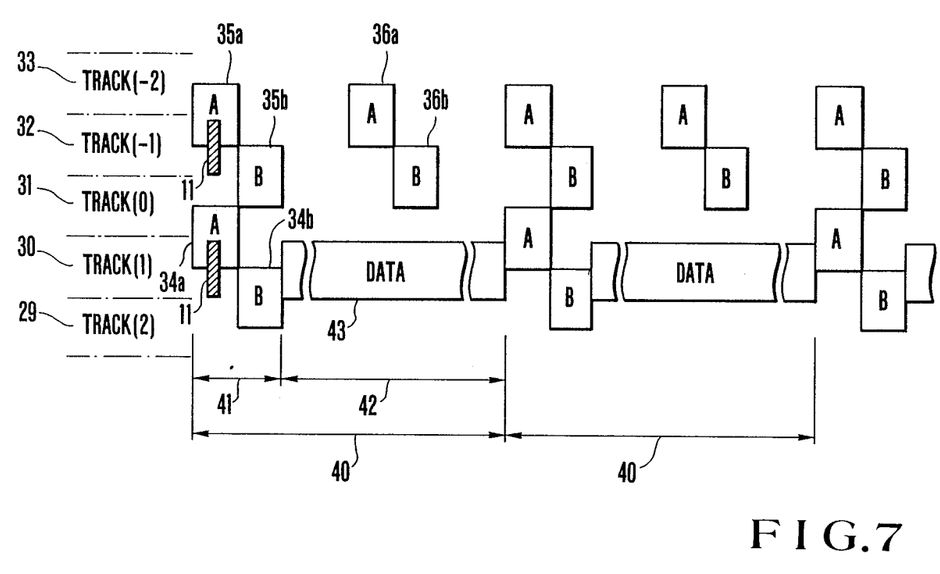
FIG. 7 shows the recording format of a floppy disk of a track-following control system according to another embodiment of the present invention.

FIG. 7 shows the recording format of two adjacent sectors of a floppy disk according to another embodiment of the present invention.

In this embodiment, the operations from the readout of recorded information by the magnetic head to the drive control of the magnetic head by the position error signal are executed by the circuit similar to that shown in FIG. 4, and the detailed description is omitted.

In this embodiment, a servo track (track (−1)) 32 for recording only servo information for positioning the magnetic head 11 is provided outside a data track (track (1)) 30 of the floppy disk. The position of the servo track 32 can be arbitrarily selected and is preferable if it is provided on the outermost or innermost track of the floppy disk.

A servo information area 41 for recording the servo information is provided at the beginning of each sector of all the data tracks. The remaining portion 42 of the data track is defined as a data area for recording data.

The servo pattern concerning the track 30 consists of servo information 34a, recorded on the first half of the track 30 and the adjacent half of a track (0) 31 adjacent to the outer side to the track 30, and servo information 34b, recorded on the second half of the track 30 and the adjacent half of a track 29 adjacent to the inner side of the track 30. The position of servo information 34b is offset from that of the servo information 34a. The servo information 34a and the servo information 34b have different waveforms and can be distinguished from each other. Therefore, when the magnetic head 11 is correctly positioned at a central portion of the track 30, an output of the servo information 34a becomes equal to that of the servo information 34b. On the other hand, when the magnetic head 11 is offset toward either the track 29 or 31, the outputs of the servo information 34a and the servo information 34b are not balanced. The track 30 can be correctly followed when the position of the magnetic head 11 is determined to equal these outputs.

On the servo track 32, servo information 35a and servo information 35b are recorded at the positions identical to those of the servo information area 41 of each sector of the data track 30. Furthermore, servo information 36a and servo information 36b are recorded at an intermediate portion of the data information area 42 of the data track in the same pattern as that of the servo information 35a and the servo information 35b.

The number of location of the servo information at the intermediate portion of the data area 42 is not limited to one, and the servo information can be recorded at two portions or more, or can be continuous throughout the servo track.

Data is recorded in or read out from the floppy disk having the above arrangement in the following manner.

More specifically, prior to recording or regeneration of the initial data, the magnetic head 11 is positioned at the servo track 32 as the preparatory operation. The servo information 35a and the servo information 35b are read out from the servo track 32, and information concerning the distortion of the floppy disk is obtained based on the readout information 35a and the readout information 35b. When the floppy disk is deformed as shown in FIG. 1, the servo information 35a, the servo information 35b, the servo information 36a, the servo information 36b, and so on of the servo track 32 are read out to obtain a direction of the distortion, i.e., whether the distortion is centripetal or centrifugal, and the amount of distortion, i.e., the amount of position adjustment required for the magnetic head, at the angular position of the rotation of the floppy disk storing these pieces of servo information. The obtained direction and the amount of distortion are recorded in the memory 17B of the controller 17 as the distortion information.

When the above preparatory operation is completed, normal data recording/regeneration is performed. When the amount of distortion of the floppy disk is small and the magnetic head 11 can read out all the servo information, the magnetic head 11 is positioned or the track-following operation by the magnetic head 11 is performed using a position error signal obtained from the readout servo information. In the data area 42, the magnetic head 11 is maintained at the position set based on the servo information 34a and the servo information 34b of the sector 40, and data 43 is recorded or regenerated.

When the amount of distortion of the floppy disk is large and servo information of a specific sector cannot be read out, the servo information is added using the distortion information of the servo track 32 which has been stored in advance. More specifically, a direction in which the magnetic head 11 should move to perform the track-following operation is determined using the information about the distortion direction of the servo track 32. The amount to be corrected is calculated from the information about the distortion amount of the servo track 32 and the ratio in diameter of the servo track 32 to target data track, and the magnetic head is positioned on the target track.

When one sector is long, i.e., the number of sectors is small, if the magnetic head 11 is held at a position of the sector determined by the servo information, the magnetic head 11 is deviated from the center of the data track in the second half of the data area, and the magnitude of a recorded or regenerated output of the data information is decreased. In this case, the magnetic head 11 is positioned by using the distortion direction and its amount obtained from the prestored servo information 36a and the prestored servo information 36b of the intermediate portion of the sector. As a result, the data can be recorded or regenerated while causing the magnetic head 11 to constantly and optimally perform the track-following operation. Even when a single track consists of a single sector in an extreme case, the magnetic head 11 of the FDD can record or regenerate information while following a deformed track in accordance with the control system of this embodiment.

When data recording/regeneration is continuously performed, the environmental conditions change. Therefore, it is sometimes impossible to sufficiently perform the track-following operation by the magnetic head 11 in accordance with the distortion information of the floppy disk based on the servo information initially read out from the servo track 32. In order to cope with this, a means for updating the servo information of the servo track at appropriate time intervals may be used. Furthermore, every time a track-following operation for recording or regenerating data, as described above, is performed, or after an appropriate time lapse from the track-following operation, the servo information 34a and the servo information 34b on the data track 30 can be corrected, and subsequent positioning operations can be performed by the above-described manner in accordance with the correction result. As a result, the stable positioning/track-following operation can be performed in accordance with the latest distortion information without a need for a special operation for correcting the distortion information during a continuous recording/regenerating operation.

As described above in detail, with the track-following control system of the magnetic head according to the present invention, even when a floppy disk has anisotropic deformation despite that a sector servo method is adopted, the magnetic head having good track-following characteristics can perform stable positioning. As a result, the reliability in recording/regeneration of data information of an FDD can be increased.

What is claimed is:

1. A track-following control system for a magnetic disk drive, comprising:

a magnetic disk having a plurality of tracks each of which is divided into a plurality of sectors and stores not less than one track position signal indicating a position of a track in each sector of said track;

a magnetic head for writing and reading out data in and from said magnetic disk and reading out said track position signal from said magnetic disk;

position error signal generating means for generating a position error signal in numbers of sectors indicating a position error between said magnetic head and said track by using the track position signal read out by said magnetic head;

calculating and outputting means for calculating and outputting position error signals having a larger number than that of said sectors by using the position error signal supplied from said position error signal generating means; and positioning means for positioning said magnetic head in accordance with said position error signals having the larger number than that of said sectors, wherein said positioning means performs track-following of said magnetic disk; and wherein a single track position signal is recorded in said numbers of sectors of a single track of said magnetic disk, and said calculating and outputting means for calculating and outputting said position error signals having the larger number than that of said sectors comprises generating and storing means for generating and storing a signal representing an estimated intra-sector position error by using an interpolation technique based on said error signals in said numbers of sectors, and wherein said calculating and outputting means for calculating and outputting said position error signals of the number larger than that of said sectors comprises:

obtaining means for obtaining a number of terms and corresponding coefficients of an equation of an autoregressive model by using simulation and storing an obtained result, said autoregressive model being used to obtain a later position error by multiplying a previous, actual position error signal and said estimated position error obtained by interpolation by said corresponding coefficients, respectively, and adding both products; and predicting means for predicting a future position error by multiplying said actual position error signal and said estimated intra-sector position error signal by said corresponding coefficients stored, respectively, and adding both products, and outputting a sum.

* * * * *

UNITED STATES PATENT AND TRADEMARK OFFICE
CERTIFICATE OF CORRECTION

PATENT NO. : 4,977,470
DATED : December 11, 1990
INVENTOR(S) : Hiroki MURAYAMA

It is certified that error appears in the above-identified patent and that said Letters Patent is hereby corrected as shown below:

ON TITLE PAGE:
 [22] Please change "January 13, 1989" to --January 13, 1988--.

Signed and Sealed this

Fifteenth Day of September, 1992

Attest:

DOUGLAS B. COMER

*Attesting Officer*   Acting Commissioner of Patents and Trademarks